(12) United States Patent
Grant

(10) Patent No.: US 6,375,467 B1
(45) Date of Patent: Apr. 23, 2002

(54) SOUND COMPREHENDING AND RECOGNIZING SYSTEM

(76) Inventor: Sonia Grant, 531 W. 152nd St. #1D, New York, NY (US) 10031

( * ) Notice: Subject to any disclaimer, the term of this patent is extended or adjusted under 35 U.S.C. 154(b) by 0 days.

(21) Appl. No.: 09/862,226

(22) Filed: May 22, 2001

Related U.S. Application Data

(60) Provisional application No. 60/206,071, filed on May 22, 2000.

(51) Int. Cl.[7] .................................................. G09B 1/16
(52) U.S. Cl. ........................ 434/167; 434/172; 434/112
(58) Field of Search ................................ 434/112, 116, 434/167, 171, 172, 159; 84/470 R, 476, 471 R

(56) References Cited

U.S. PATENT DOCUMENTS

| | | | | |
|---|---|---|---|---|
| 4,516,215 A | * | 5/1985 | Hakaridani et al. | ......... 704/234 |
| 4,581,756 A | * | 4/1986 | Togawa et al. | ............. 704/254 |
| 4,661,915 A | * | 4/1987 | Ott | .............................. 704/235 |
| 4,674,112 A | * | 6/1987 | Kondraske et al. | ............ 379/52 |
| 4,769,846 A | * | 9/1988 | Simmons | ..................... 704/258 |
| 5,146,502 A | * | 9/1992 | Davis | ........................... 379/52 |
| 6,077,080 A | * | 6/2000 | Rai | .............................. 434/159 |

* cited by examiner

*Primary Examiner*—Kien T. Nguyen
(74) *Attorney, Agent, or Firm*—Goldstein Law Offices, P.C.

(57) ABSTRACT

A graphical representation regarding one or more words. The design includes a horizontal axis and a vertical axis. The vertical axis has all of the letters of the alphabet arranged vertically in order. The horizontal axis includes one or more discrete locations. A first letter of the word is represented at the discrete location. Immediately below the discrete location is a sub-location where the first and a second letter of the word are represented. A bar graph extends immediately above the discrete location to a height dictated by the second letter, such that the bar graph extends to the height of said second letter on the vertical axis. An image of a word having the same first and second letters is provided immediately above the bar graph.

2 Claims, 2 Drawing Sheets

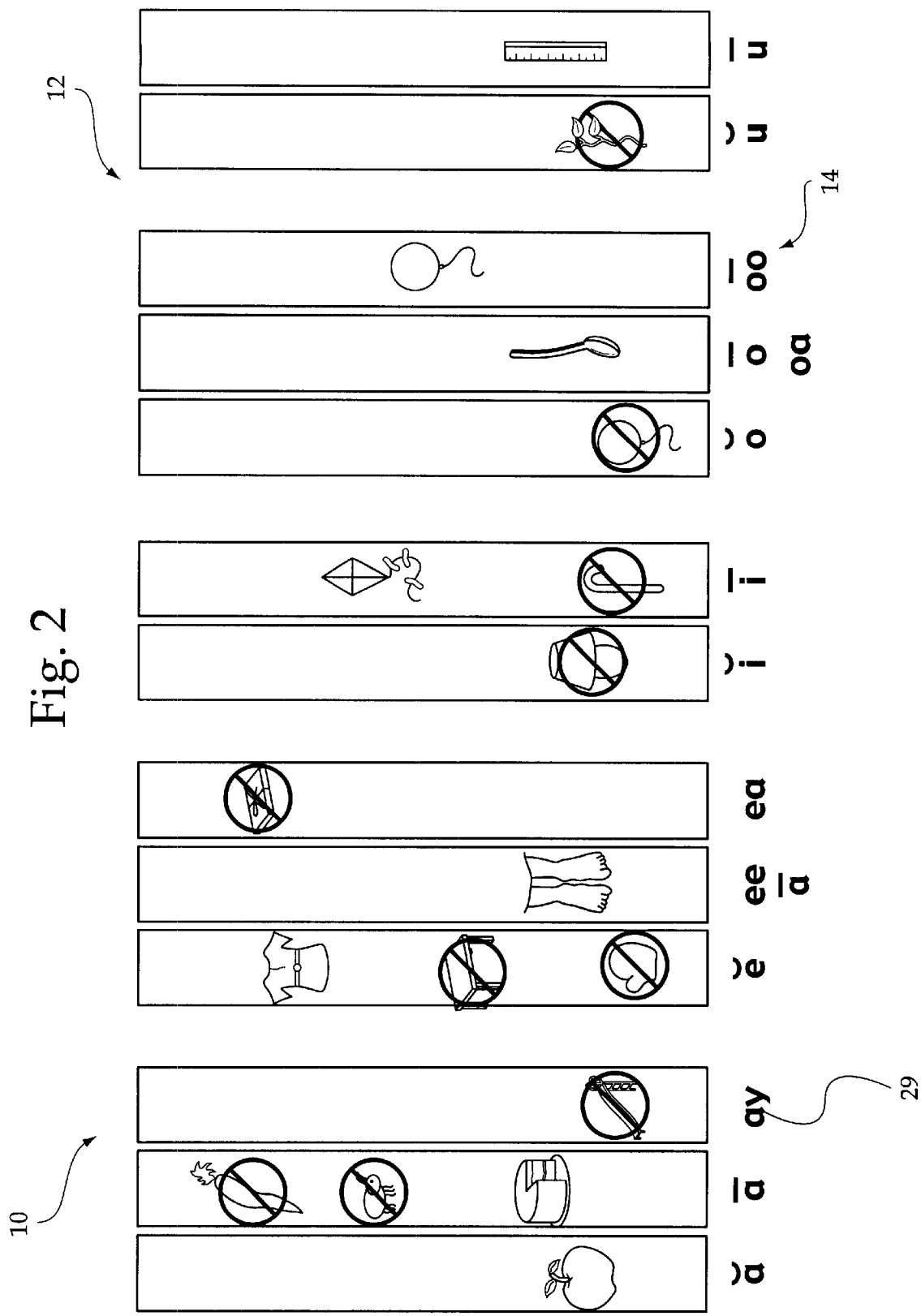

SOUND COMPREHENDING AND RECOGNIZING SYSTEM

CROSS REFERENCES AND RELATED SUBJECT MATTER

This application relates to subject matter contained in provisional patent application Ser. No. 60/206,071, filed in the United States Patent Office on May 22, 2000.

BACKGROUND OF THE INVENTION

The present invention relates to a sound comprehending and recognizing system and more particularly pertains to allowing learning disabled children to learn how to properly pronounce and recognize words.

Children learning to speak generally have a difficult time sorting out the multitude of individual sounds that are used in pronouncing different words. It typically takes several years before all or even most words and sounds are pronounced properly. Even in grade school, "phonics" instruction is continued to help correct mispronunciations and promote greater understanding of the various sounds.

However, children with learning disabilities have a much more difficult time with the various sounds that make up a language. Further, children with hearing and speaking impairments are severely disadvantaged in this regard, and require additional assistance, and additional tools to help them achieve proficiency.

The use of teaching aids is known in the prior art. More specifically, teaching aids heretofore devised and utilized for the purpose of teaching children are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,146,502 to Davis discloses a speech pattern correction device for deaf and voice-impaired. U.S. Pat. No. 4,674,112 to Kondraske et al. discloses a character pattern recognition and communications apparatus. U.S. Pat. No. 4,769,846 to Simmons discloses a speech therapy variable code learning translator. U.S. Pat. No. 4,581,756 to Togawa et al. discloses a recognition of speech or speech-like sounds using associative memory. U.S. Pat. No. 4,661,915 to Ott discloses an allophone vocoder. U.S. Pat. No. 4,516,215 to Hakaridani et al. discloses a recognition of speech or speech-like sounds.

While these devices fulfill their respective, particular objective and requirements, the aforementioned patents do not describe a sound comprehending and recognizing system for allowing learning disabled children to learn how to properly pronounce and recognize words.

In this respect, the sound comprehending and recognizing system according to the present invention substantially departs from the conventional concepts and designs of the prior art, and in doing so provides an apparatus primarily developed for the purpose of allowing learning disabled children to learn how to properly pronounce and recognize words.

Therefore, it can be appreciated that there exists a continuing need for a new and improved sound comprehending and recognizing system which can be used for allowing learning disabled children to learn how to properly pronounce and recognize words. In this regard, the present invention substantially fulfills this need.

SUMMARY OF THE INVENTION

In the view of the foregoing disadvantages inherent in the known types of teaching aids now present in the prior art, the present invention provides an improved sound comprehending and recognizing system. As such, the general purpose of the present invention, which will be described subsequently in greater detail, is to provide a new and improved sound comprehending and recognizing system which has all the advantages of the prior art and none of the disadvantages.

To attain this, the present invention essentially comprises a graphical representation regarding one or more words. The design includes a horizontal axis and a vertical axis. The vertical axis has all of the letters of the alphabet arranged vertically in order. The horizontal axis includes one or more discrete locations. A first letter of the word is represented at the discrete location. Immediately below the discrete location is a sub-location where the first and a second letter of the word are represented. A bar graph extends immediately above the discrete location to a height dictated by the second letter, such that the bar graph extends to the height of said second letter on the vertical axis. An image of a word having the same first and second letters is provided immediately above the bar graph.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved sound comprehending and recognizing system which has all the advantages of the prior art teaching aids and none of the disadvantages.

It is another object of the present invention to provide a new and improved sound comprehending and recognizing system which may be easily and efficiently manufactured and marketed.

It is a further object of the present invention to provide a new and improved sound comprehending and recognizing system which is of durable and reliable construction.

An even further object of the present invention is to provide a new and improved sound comprehending and recognizing system which is susceptible of a low cost of manufacture with regard to both materials and labor, and which accordingly is then susceptible of low prices of sale to the consuming public, thereby making such a sound comprehending and recognizing system economically available to the buying public.

Even still another object of the present invention is to provide a new and improved sound comprehending and recognizing system for allowing learning disabled children to learn how to properly pronounce and recognize words.

Lastly, it is an object of the present invention to provide a new and improved sound comprehending and recognizing system including a graphical representation regarding one or more words. The design includes a horizontal axis and a vertical axis. The vertical axis has all of the letters of the alphabet arranged vertically in order. The horizontal axis includes one or more discrete locations. A first letter of the word is represented at the discrete location. Immediately below the discrete location is a sub-location where the first and a second letter of the word are represented. A bar graph extends immediately above the discrete location to a height dictated by the second letter, such that the bar graph extends to the height of said second letter on the vertical axis. An image of a word having the same first and second letters is provided immediately above the bar graph.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is an illustration of another example of a word pronouncing card of the present invention.

The same reference numerals refer to the same parts through the various figures.

DESCRIPTION OF THE PREFERRED EMBODIMENT

Figure 1:
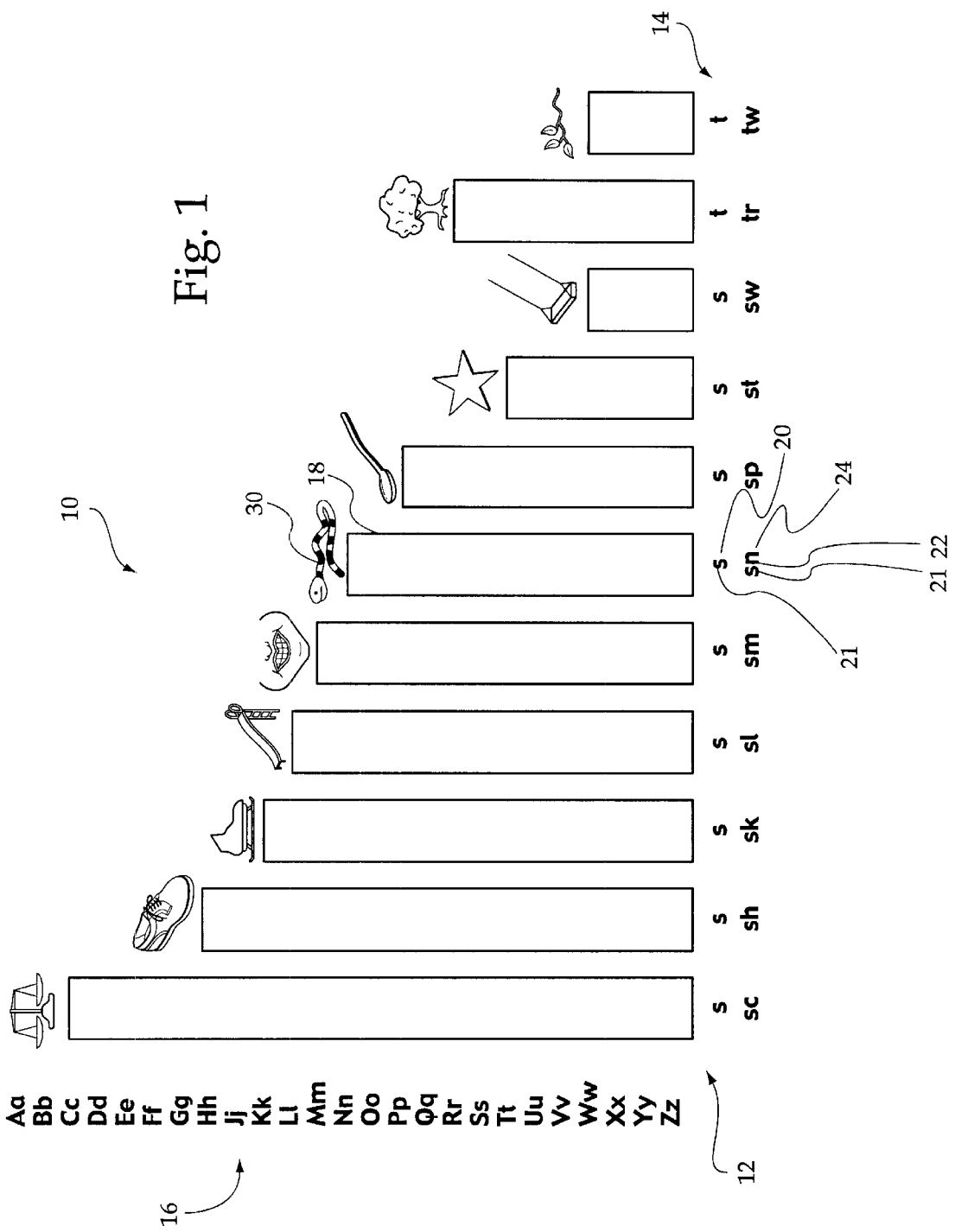
FIG. 1 is an illustration of the preferred embodiment of the sound comprehending and recognizing system in accordance with the principles of the present invention.

With reference now to the drawings, and in particular, to FIGS. 1 and 2 thereof, the preferred embodiment of the new and improved sound comprehending and recognizing system embodying the principles and concepts of the present invention and generally designated by the reference number 10 will be described.

Specifically, it will be noted in the various figures that the device relates to a sound comprehending and recognizing system for allowing learning disabled children to learn how to properly pronounce and recognize words.

The present invention is essentially comprised of a graphical representation 12 or "graph" 12. The graphical representation 12 may be imprinted on a page or chart, or may be displayed on a computer screen or television monitor. The graphical representation 12 is specifically designed to facilitate the learning process in children with learning disabilities, speech impediments and memory loss. The present invention is designed to enable a student to recall the letters and symbols that are associated with each sound. The graph 12 includes a horizontal axis 14 and a vertical axis 16. The vertical axis 16 includes letters of the alphabet 17, arranged in order in order from top to bottom, wherein each of the letters are located at various heights on said vertical axis 16. The horizontal axis 14 includes one or more distinct locations 20, wherein a particular letter of the alphabet, known as a first letter 21 is indicated. Beneath the distinct location 20 is a sub-location 24. At the sub-location 24, the first letter 21 is repeated, and is immediately followed by a second letter 22.

In accordance with the principles of the present invention, a bar graph 18 extends vertically from a point immediately above the distinct location 20, to a height equivalent to the height of the second letter 22 on the vertical axis 16. In addition, an image 30 is located immediately above the bar graph 18, which is of an item commonly recognizable to the student, and which is spelled with the same first letter 21 and second letter 22. Accordingly, the graphic representations 12 includes images thereon aligned with one of the particular letters and corresponding consonant letter on the horizontal axis 14 and one of the letters of the alphabet of the vertical axis 16 according to letters used to spell out the illustration. This will allow the student to recognize the letters and sounds associated with the illustrations. FIG. 1 illustrates particular items that start with the first letter "s", such as scale, shoe, skate, slide, smile, snake, spoon, star, and swing.

For example, as shown in FIG. 1, the featured first letter is "s", and the second letter is "n". The letter "s" is prominently indicated at the distinct location 20. The bar graph 18 corresponds to a height of the letter "n" on the vertical axis-giving the student the clear indication that the starting sound for the word is "sn". In addition, "sn" is reproduced at the sub-location 24. Further an image of a "snake" is provided above the bar graph 18 to further reinforce that the starting sound for the word is "sn".

Accordingly, the student of the system is aided by the first letter 21, at the first location, the addition of the second letter 22 along with the first letter 21 at the sub-location 24, by the fact that the bar graph 18 extends to the height of the second letter 22 along the vertical axis, and the presence of the image 30 which is readily recognizable by the student and which begins with that first letter 21 and second letter 22.

Further, with regard to FIG. 2, vowel sounds 29 within the word may be optionally presented to the student, wherein images 30 are also employed to help the student associate the proper sound with a known sound from a known item.

The graphic representation 12 of the present invention is treated conceptually herein. The above principles can be applied both to situations where the student is to attempt to pronounce the word corresponding to the very same image 30 depicted, or to pronounce another word which begins with the same first letter 21 and second letter 22. In addition, the principles of the graphic representation 12 can be applied to both printed teaching tools, as well as computerized teaching tools. In the case of computerized teaching tools, it is contemplated that the graphic representation may be used in an automated lesson, wherein the student is presented with a variety of words, or may be used in an interactive system, wherein a suitable graphic representation is customized by the computer to provide pronunciation assistance where the student types in a word he or she wishes to pronounce. It should be understood that numerous variations, employing the graphic representation 12 and reasonable variations thereof may be employed in meeting the goals of the present invention.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A sound comprehending and recognizing system for allowing a student to learn how to properly pronounce and recognize a word comprising, in combination:

a graph, the graph including a horizontal axis and a vertical axis, the vertical axis having all of the letters of the alphabet arranged vertically along said vertical axis, the horizontal axis including at least one particular letter of the alphabet located at a discrete location along said horizontal axis, the particular letter of the alphabet representing a first letter of a word, the word also having a second letter, a sub location is immediately below the discrete location, the first letter is repeated and then the second letter is present at a sub location, a bar graph extends from immediately above the discrete location to a height dictated by the second letter such that the bar graph extends to a height of the second letter on the vertical axis whereby correspondence of the bar graph height with the vertical axis helps the student determine the precise sound that represents pronunciation of the first two letters of the word.

2. The sound comprehending and recognizing system as recited in claim 1, wherein the graphical representation further includes an image located immediately above the bar graph, the image being of an item which begins with the first letter and second letter.

* * * * *